(12) United States Patent
Myers et al.

(10) Patent No.: US 6,259,956 B1
(45) Date of Patent: Jul. 10, 2001

(54) METHOD AND APPARATUS FOR SITE MANAGEMENT

(75) Inventors: Robert J. Myers, Kenly; William Long, III, Tarboro; Ben E. Winstead, III, Rocky Mount, all of NC (US)

(73) Assignee: Rawl & Winstead, Inc., Rocky Mount, NC (US)

( * ) Notice: Subject to any disclaimer, the term of this patent is extended or adjusted under 35 U.S.C. 154(b) by 0 days.

(21) Appl. No.: 09/231,506

(22) Filed: Jan. 14, 1999

(51) Int. Cl.$^7$ ........................................ G05B 9/02
(52) U.S. Cl. ............................... 700/80; 700/244
(58) Field of Search ................ 700/80, 236, 244, 700/241

(56) References Cited

U.S. PATENT DOCUMENTS

| | | |
|---|---|---|
| 4,486,625 | 12/1984 | Reinauer . |
| 5,319,544 | 6/1994 | Schmerer . |
| 5,319,545 | 6/1994 | McGarvey . |
| 5,361,216 * | 11/1994 | Warn et al. ............................ 700/283 |
| 5,363,093 | 11/1994 | Williams . |
| 5,400,253 | 3/1995 | O'Connor . |
| 5,568,121 | 10/1996 | Lamensdorf . |
| 5,586,050 | 12/1996 | Makel . |
| 5,612,890 * | 3/1997 | Strasser et al. ....................... 700/241 |
| 5,694,326 * | 12/1997 | Warn et al. ............................ 700/231 |
| 5,706,896 | 1/1998 | Tubel . |
| 5,751,346 | 5/1998 | Dozier . |
| 5,757,664 | 5/1998 | Rogers . |
| 5,790,409 | 8/1998 | Fedor . |
| 5,801,618 | 9/1998 | Jenkins . |
| 5,859,779 * | 1/1999 | Giordano et al. ..................... 700/231 |
| 5,980,090 * | 11/1999 | Royal, Jr. et al. ..................... 700/241 |
| 6,052,629 * | 4/2000 | Leatherman et al. ................. 700/241 |

OTHER PUBLICATIONS

Graves et al., US Sir No. H1743, Aug. 4, 1998.*

* cited by examiner

*Primary Examiner*—William Grant
*Assistant Examiner*—Edward F Gain, Jr.
(74) *Attorney, Agent, or Firm*—Olive & Olive, PA

(57) ABSTRACT

A method and apparatus for monitoring and maintenance of unattended robot liquid storage and dispensing sites, including a site controller and site monitor. The site monitor continuously appends text strings received from the site controller to HTML text log files and HTLM text report files and simultaneously compares the stored text strings representing site events to be monitored with evaluation messages. Each evaluation message is linked to an alert code, which in response to an evaluation message text string match initiates a particular set of responses, including sending notice of site failures and other remote site information to a home office via fax, pager and/or email. The site monitor also collects the information gathered from the site controller, the tank monitor, alarm system and any other site devices and stores the information in a one or more HTML text files, which information then takes the form of a web page with hypertext links to images related to the stored information.

30 Claims, 9 Drawing Sheets

| Return to Menu | Add New Report | | | | | | | |
|---|---|---|---|---|---|---|---|---|
| Report Code | Email Group | Command | Timeout | Timeout Code | Eval File | Archive File | | |
| ALI | | | 35 | 12 | | ALIVE | Change | Delete |
| DELIVERY | | | 60 | 18 | | | Change | Delete |
| DIG | diagnostic.group | | 250 | 12 | mon.dat | DIAG | Change | Delete |
| DL1 | daily.group | /home/usfleet/scripts/daily | 1500 | 12 | | DAILY | Change | Delete |
| ERROR | | | 10 | 16 | | | Change | Delete |
| FUELPOINT | | | 15 | 21 | | | Change | Delete |
| FUL | standard.group | | 250 | 12 | inv.eval | FUEL | Change | Delete |
| INV | inventory.group | | 1500 | 12 | | INVENT | Change | Delete |
| PRI | price.group | | 11000 | 1 | | | Change | Delete |
| REA | | lp /home/usfleet/scripts/REA.last | | | | | Change | Delete |
| SEC | | lp /home/usfleet/scripts/SEC.last | | | | | Change | Delete |
| SRP | | lp /home/usfleet/scripts/SRP.last | | | | | Change | Delete |
| TXT | | lp /home/usfleet/scripts/TXT.last | | | | | Change | Delete |
| WEK | | lp /home/usfleet/scripts/WEK.last | | | | | Change | Delete |

FIG. 5A

| Return to Menu | Add New Evaluation Message | | |
|---|---|---|---|
| Alert Code | Evaluation Message | | |
| 1 | Battery failure | Change | Delete |
| 1 | Paper low | Change | Delete |
| 2 | CFN verification did not respond | Change | Delete |
| 2 | Card Reader Terminal #1 on loop 1 went down | Change | Delete |
| 2 | Fuel leak | Change | Delete |
| 2 | Pump #1 disabled | Change | Delete |
| 2 | Pump #2 disabled | Change | Delete |
| 2 | Pump #3 disabled | Change | Delete |
| 2 | Pump #4 disabled | Change | Delete |
| 2 | Pump #5 disabled | Change | Delete |
| 2 | Pump #6 disabled | Change | Delete |
| 2 | Pump Control Unit #1 never came up | Change | Delete |
| 2 | Pump Control Unit #1 went down | Change | Delete |
| 2 | Pump Control Unit #2 never came up | Change | Delete |
| 2 | Pump Control Unit #2 went down | Change | Delete |
| 2 | Pump Control Unit #3 never came up | Change | Delete |
| 2 | Pump Control Unit #3 went down | Change | Delete |
| 2 | Pump Control Unit #4 never came up | Change | Delete |
| 2 | Pump Control Unit #4 went down | Change | Delete |

FIG. 5B

| | | | |
|---|---|---|---|
| 2 | Pump Control Unit #5 never came up | Change | Delete |
| 2 | Pump Control Unit #5 went down | Change | Delete |
| 2 | Pump Control Unit #6 never came up | Change | Delete |
| 2 | Pump Control Unit #6 went down | Change | Delete |
| 2 | Theft alarm | Change | Delete |
| 5 | ABORT | Change | Delete |
| 5 | Card has expired | Change | Delete |
| 5 | Card is not valid | Change | Delete |
| 5 | EXCEEDS AMOUNT LIMIT | Change | Delete |
| 5 | Failed, please retry | Change | Delete |
| 5 | Failed | Change | Delete |
| 5 | Invalid PIN | Change | Delete |
| 5 | Invalid fuel | Change | Delete |
| 5 | Invalid pump | Change | Delete |
| 5 | Limit | Change | Delete |
| 5 | Pump busy | Change | Delete |
| 5 | Timed out | Change | Delete |
| 5 | Verification aborted | Change | Delete |
| 5 | Zero | Change | Delete |
| 5 | Zero | Change | Delete |

FIG. 5C

| | | | |
|---|---|---|---|
| 8 | Card Reader Terminal #2 on loop 1 went down | Change | Delete |
| 8 | Paper refilled | Change | Delete |
| 8 | Printer up | Change | Delete |
| 8 | Pump #11 disabled | Change | Delete |
| 8 | Pump #12 disabled | Change | Delete |
| 8 | Pump #7 disabled | Change | Delete |
| 8 | Pump Control Unit #12 went down | Change | Delete |
| 8 | Pump Control Unit #7 never came up | Change | Delete |
| 8 | Pump Control Unit #7 went down | Change | Delete |
| 8 | Pump Control Unit #11 never came up | Change | Delete |
| 8 | Pump Control Unit #11 went down | Change | Delete |
| 9 | came up | Change | Delete |
| 9 | Disabled | Change | Delete |
| 9 | Down | Change | Delete |
| 9 | Out of paper | Change | Delete |
| 9 | Paper Out | Change | Delete |
| 9 | Printer down | Change | Delete |
| 9 | disabled | Change | Delete |
| 9 | down | Change | Delete |
| 9 | never came up | Change | Delete |
| 9 | went down | Change | Delete |

| | | | |
|---|---|---|---|
| 10 | Card Reader Terminal #3 on loop 1 went down | Change | Delete |
| 10 | Pump #10 disabled | Change | Delete |
| 10 | Pump #9 disabled | Change | Delete |
| 10 | Pump Control Unit #10 never came up | Change | Delete |
| 10 | Pump Control Unit #10 went down | Change | Delete |
| 10 | Pump Control Unit #9 never came up | Change | Delete |
| 10 | Pump Control Unit #9 went down | Change | Delete |
| 11 | Pump #13 disabled | Change | Delete |
| 11 | Pump #8 disabled | Change | Delete |
| 11 | Pump Control Unit #13 never came up | Change | Delete |
| 11 | Pump Control Unit #13 went down | Change | Delete |
| 11 | Pump Control Unit #8 on loop 1 never came up | Change | Delete |
| 11 | Pump Control Unit #8 on loop 1 went down | Change | Delete |
| 13 | TRANBACK.DTA | Change | Delete |
| 14 | SYSBACK.DTA | Change | Delete |
| 15 | below reorder level | Change | Delete |
| 17 | Delivery | Change | Delete |

FIG. 5D

| FIG. 5A |
|---|
| FIG. 5B |
| FIG. 5C |
| FIG. 5D |

| Return to Menu | Add New Alert Code | | | | |
|---|---|---|---|---|---|
| Code | Email Group | Camera | Command | Wait Time | Test File | | |
|---|---|---|---|---|---|---|---|
| 1 | standard.group | | | 0 | | Change | Delete |
| 2 | emergency.group | all | | 60 | | Change | Delete |
| 3 | inventory.group | | | 0 | | Change | Delete |
| 4 | daily.group | all | | 60 | | Change | Delete |
| 5 | | | | 0 | ERROR.log | Change | Delete |
| 6 | diagnostic.group | | | 60 | | Change | Delete |
| 7 | lowproduct.group | | | 0 | | Change | Delete |
| 8 | emergency.group | all | | 60 | | Change | Delete |
| 9 | emergency.group | all | | 60 | | Change | Delete |
| 10 | emergency.group | all | | 60 | | Change | Delete |
| 11 | emergency.group | all | | 60 | | Change | Delete |
| 12 | | | gettran | 0 | | Change | Delete |
| 13 | | | getsys | 0 | | Change | Delete |
| 14 | | | runcmd checkup | 0 | | Change | Delete |
| 15 | standard.group | | | | | Change | Delete |
| 16 | error.group | | | | | Change | Delete |
| 17 | standard.group | all | | | DELIVERY.log | Change | Delete |
| 18 | delivery.group | | | | | Change | Delete |
| 19 | standard.group | | runcmd reading | 0 | | Change | Delete |
| 20 | standard.group | all | runcmd gosecur | 0 | | Change | Delete |
| 21 | fuelpoint.group | all | | 0 | FUELPOINT.log | Change | Delete |
| 22 | cfn.group | | | 0 | | Change | Delete |
| 23 | crash.group | | | 0 | | Change | Delete |
| 24 | sales.group | | | 0 | | Change | Delete |
| 99 | | all | | 0 | | Change | Delete |

METHOD AND APPARATUS FOR SITE MANAGEMENT

BACKGROUND OF THE INVENTION

1. Field of the Invention

This site manager of the present invention relates to a method and apparatus for monitoring and maintaining unattended robot liquid storage and dispensing sites, in particular, monitoring and maintaining robot vehicle fuel storage and dispensing sites located at roadside.

2. Background of the Prior Art

A wide variety of industries must constantly monitor and manage site devices such as fuel pumps, inventory, and transactions at one or more robot liquid storage and dispensing sites. Such industries include the chemical and municipal water industries, as well as the vehicle fuel supply industry. Computers are used to monitor and collect data from the site devices. The computer output is usually in the form of serial output to a log printer. Typically, a site attendant at the site checks the printout from the log printer to determine the status of site devices, inventory, and transactions. This process has also been more fully computerized, wherein the output is downloaded into computer memory and analyzed via computer monitor either at the site or at the home office.

Various currently known devices and methods automatically monitor remote fuel dispensing sites. For example, U.S. Pat. No. 5,400,253 discloses an automated system that constantly collects data from a fuel tank and fuel dispensing system at the point of sale for the purpose of inventory reconciliation through statistical data analysis. The '253 patent uses a communication computer at the remote site to collect data from the site devices and is used simply to communicate the data to a central computer. The review and analysis of site data must be initiated by the action of a site attendant.

U.S. Pat. No. 5,319,544 discloses use of computers for collecting inventory data at remote sites for subsequent human analysis. The inventory data collection system of the '544 patent requires that an operator dial up the computer system to retrieve site data for subsequent analysis. U.S. Pat. No. 5,757,664 discloses automatic data collection from above ground liquid containers and relates specifically to monitoring tank integrity.

It is recognized that the site manager of the present invention may be particularly suited for many applications, including the chemical industries, water supply, and the like applications. The particular application described in detail herein is for monitoring and maintaining remote robot vehicle fuel sites, it being understood that the site manager so described is equally applicable to many different applications.

Current remote robot fluid storage and dispensing technology does not automatically scan for key words contained in data collected by on-site computers and, based on predetermined parameters, automatically initiate appropriate responses thereto.

With the forgoing in mind, the general object of the present invention is to provide a method and apparatus for automatically monitoring and managing fluid dispensing transactions at remote fluid storage and dispensing sites, using the Internet.

It is a further object of the present invention to provide a method and apparatus for automatically scanning the data collected by on site computers for key words and based on predetermined parameters automatically initiate appropriate responses thereto, using the internet.

It is a further object of the present invention to provide a method and apparatus for automatically notifying and informing certain site personnel located remote from the robot liquid storage and dispensing sites about site failures.

It is another object of the invention to provide a method and apparatus for taking images of the remote sites and linking these images with data collected from site devices by on-site computers.

It is another object of the present invention to provide a method and apparatus for automatically downloading remote site data as HTML files onto a webserver for instant access from locations remote to liquid robot storage and dispensing sites.

SUMMARY OF THE INVENTION

The site manager of the present invention is a method and apparatus used in connection with substantially unattended robot liquid storage and dispensing sites, in particular, robot vehicle fuel storage and dispensing sites, located remote from a central office to provide instant access to the status of transactions and devices at the robot fuel sites, including providing immediate notice and information about robot fuel site failures to home offices or other remote locations, using the Internet. Robot fuel sites are comprised of several obvious components including fuel pumping stations and one or more fuel tanks connected thereto. The pumping stations and fuel tanks typically communicate with a computer identified herein as a "site controller," which in turn provides output though one or more of its serial ports in the form of a serial text string to a log printer. The present invention includes computer software that monitors the printer port of the site controller. It captures the text strings passing through the port and compares such output with evaluation messages. If a text string matches an evaluation message, the invention responds to the match based on predetermined parameters. By scanning the serial port of the site controller and matching text strings with evaluation messages, the software program of the present invention is able to continually and automatically monitor equipment failures, and pages, fixes, and/or emails a technician or the home office for corrective action. The software of the invention also scans the site controller output for information relating to low inventory conditions and then automatically orders fuel from fuel suppliers. In addition, the software program scans the site controller serial output to monitor customer activity at pumping stations and gives immediate notice to the site operators of problems that the customer may be having, such as keying an incorrect PIN number or trying to use an invalid card. The site operators are then able to respond immediately, contacting the driver's own office, whom can transmit to the driver still located at the remote site the correct PIN number or instructions to use another card. The software program of the invention also collects the information gathered from the site controller, the tank monitor, and alarm system and stores it in HTML text files, which take the form of web pages with hypertext links. Each hypertext link represents a specific event of the site, such as a transaction or error message. The invention also includes cameras that take images of the remote site, which are then converted to HTML image files and hyperlinked to related HTML text files. An Internet Service Provider provides continual access to each robot fuel site, allowing instant access to site information and instant response to failure or other selected conditions at the site.

BRIEF DESCRIPTION OF THE DRAWINGS

Method and apparatus embodying features of the present invention are depicted in the drawings which form a portion of this disclosure and wherein.

DETAILED DESCRIPTION OF PREFERRED EMBODIMENT OF THE INVENTION

Figure 1:
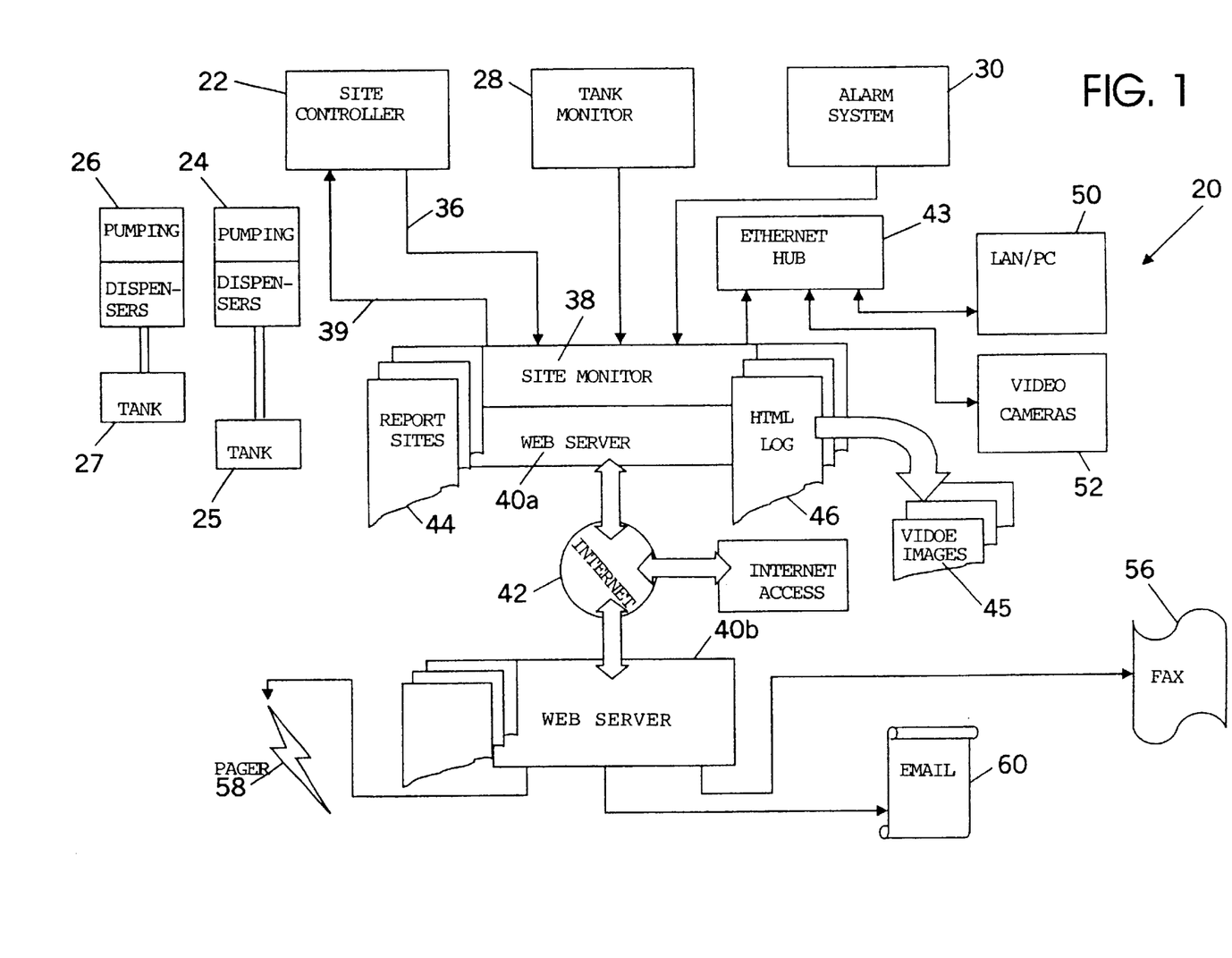
FIG. 1 is a block diagram of the total liquid storage and dispensing system of the invention.

Referring to FIG. 1, there is seen a block diagram of the overall system 20 of the invention. Site controller 22 receives data from one or more pumping dispensers 24 and 26, which are connected to fuel tanks 25 and 27, respectively. Site controller 22 may also be connected to tank monitor 28, site alarm system 30, and/or other site devices (not shown) for receiving data therefrom. Site controller 22 may be comprised of any number of computer systems. In the preferred embodiment, site controller 22 is a computer system called GASBOY™, manufactured by GasBoy, Inc. Site controller 22 gathers and records transaction and diagnostic information from the fuel site devices, including customer number, account number, vehicle number, any manual number entered, dispenser number time, date, product dispensed, odometer readings, as well as equipment and customer transaction failures. The serial output port (not shown) connected to line 36, of site controller 22 is generally known in the art to connect to a log printer (not shown). Site controller 22 known in the art simply outputs data received from site devices such as pumping dispenser 24, tank monitor 28, and/or alarm system 30 as text strings through their serial ports to log printers for printing. An employee that periodically checks in at the remote site would analyze the printout line by line to determine the activities and failures that have occurred at the site.

In the present invention, site controller 22 serial output port is connected via line 36 to site monitor 38. Site monitor 38 is the computer software of the invention residing on a personal computer. Site monitor 38 computer software can be located anywhere a computer connection to the site controller 22 can be established, and may be incorporated into the site controller 22 itself. Site monitor 38 receives text strings from site controller 22 serial port along line 36. When the site controller 22 and site monitor 38 are integrated into one device, site monitor 38 receives text strings directly from a site controller 22 text file. Webserver 40a provides site monitor 38 continual access to Internet 42. Webserver 40a is preferably an Apache™ webserver. Apache™ webserver 40a is a well known public domain HTTP server that provides secure, efficient HTTP services in sync with current HTTP standards that runs on Unix based computer hardware. Webserver 40a resides on the site monitor 38. However, a webserver may also reside on an ISP as illustrated by webserver, 40b and/or at a home office (not shown).

A bidirectional serial connection line 39 also connects site controller 22 and site monitor 38. Serial connection line 39 allows site monitor 38 to instruct site controller 22 to execute computer tasks and to download files as is generally known in the computer art. Site monitor 38 is connected to receive serial output from site controller 22, tank monitor 28, and alarm system 30. Site monitor 38 is also connected to ethernet hub 43, which allows site monitor 38 to communicate with local area networks or a PC such as a laptop computer, which are all represented by block 50, and one or more video cameras represented by block 52. Video cameras 52 take images 45 of the robot liquid storage and dispensing site for storage as HTML files in an HTML log 46 residing on site manager 38 or web server 40a for Internet 42 publication.

Site monitor 38 software program of the invention scans the text strings received from site controller 22 along line 36 using named pipes and perl scripts. Named pipes are a Unix based mechanism for quickly moving files between programs and/or machines using normal file access routines. For example:

program 1→file output/file input→program 2.

Program 1 writes its output to a file. Program 2 reads its input from a file, however there is no real file or disk storage required for the transfer. In other words, the output from program 1 is piped directly into program 2. Perl scripts are well known in the art as interpreted language optimized for scanning arbitrary text files, extracting information from those files, printing reports, and managing systems.

In summary, site monitor 38 continuously appends text strings transmitted from or stored in site controller 22 to HTML log files 46 and HTML report files 44 for each device and simultaneously compares the text strings representing events to be monitored with evaluation messages of the invention. Evaluation messages are stored in the program of the invention and correspond to the array of messages capable of being generated by site controller 22 in response to its communication with the remote site devices. Each evaluation message is linked to an alert code, which in response to an evaluation message text string match initiates a particular set of responses, including sending notice of site failures and other remote site information to a home office via fax 56, pager 58, and/or email 60. Site monitor 38 collects the information gathered from the site controller 22, the tank monitor 28, alarm system 30 and any other site devices to which it might be connected and stores it in a HTML log file 46 or HTML report files 44, which take the form of web pages with hypertext links. The information stored in the HTML files and each hypertext link represents a specific event at the site, such as a transaction or error message.

Figure 2:
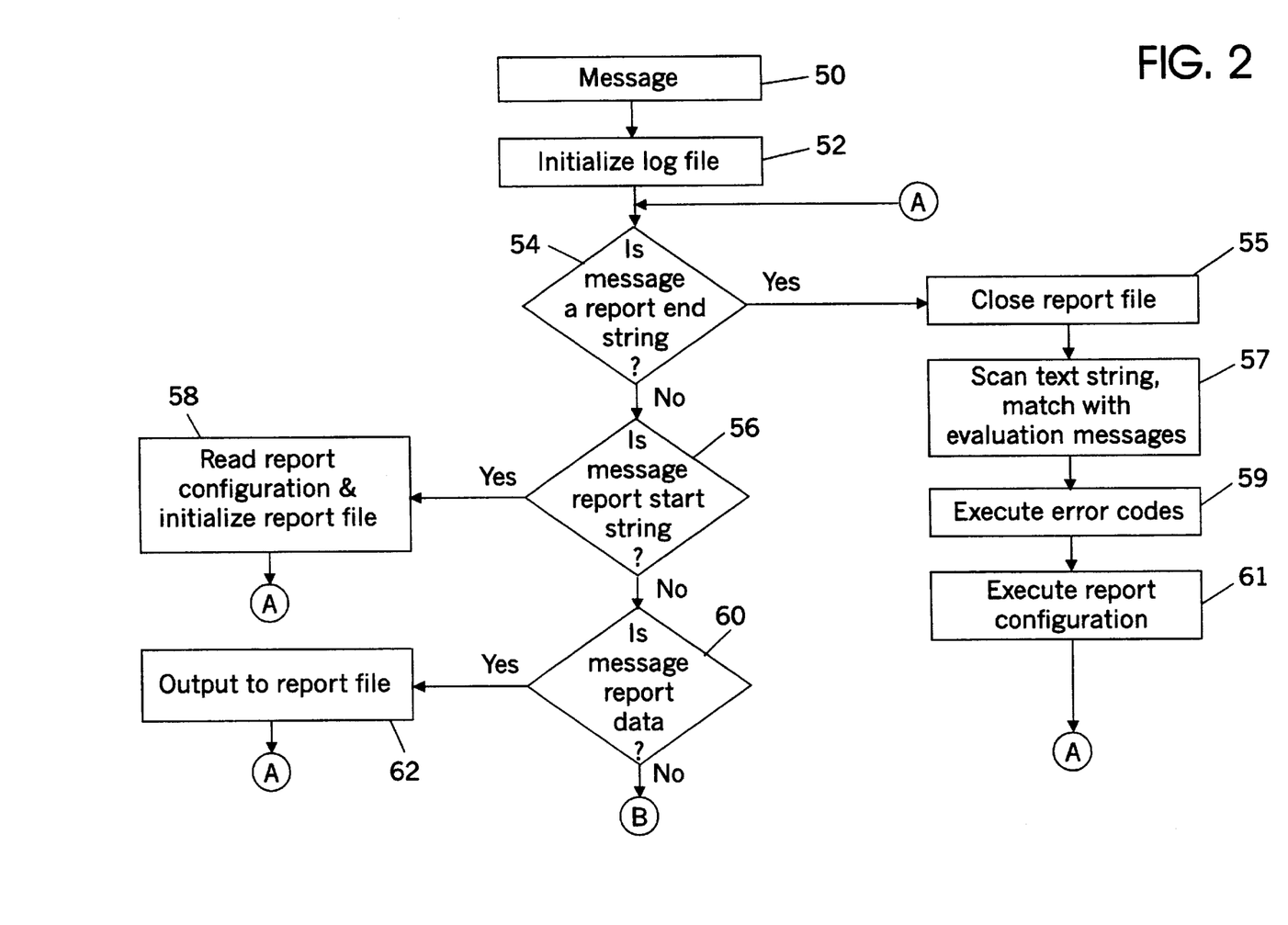
FIGS. 2 and 3 are a function block diagram of the capture program of the present invention.
Figure 3:
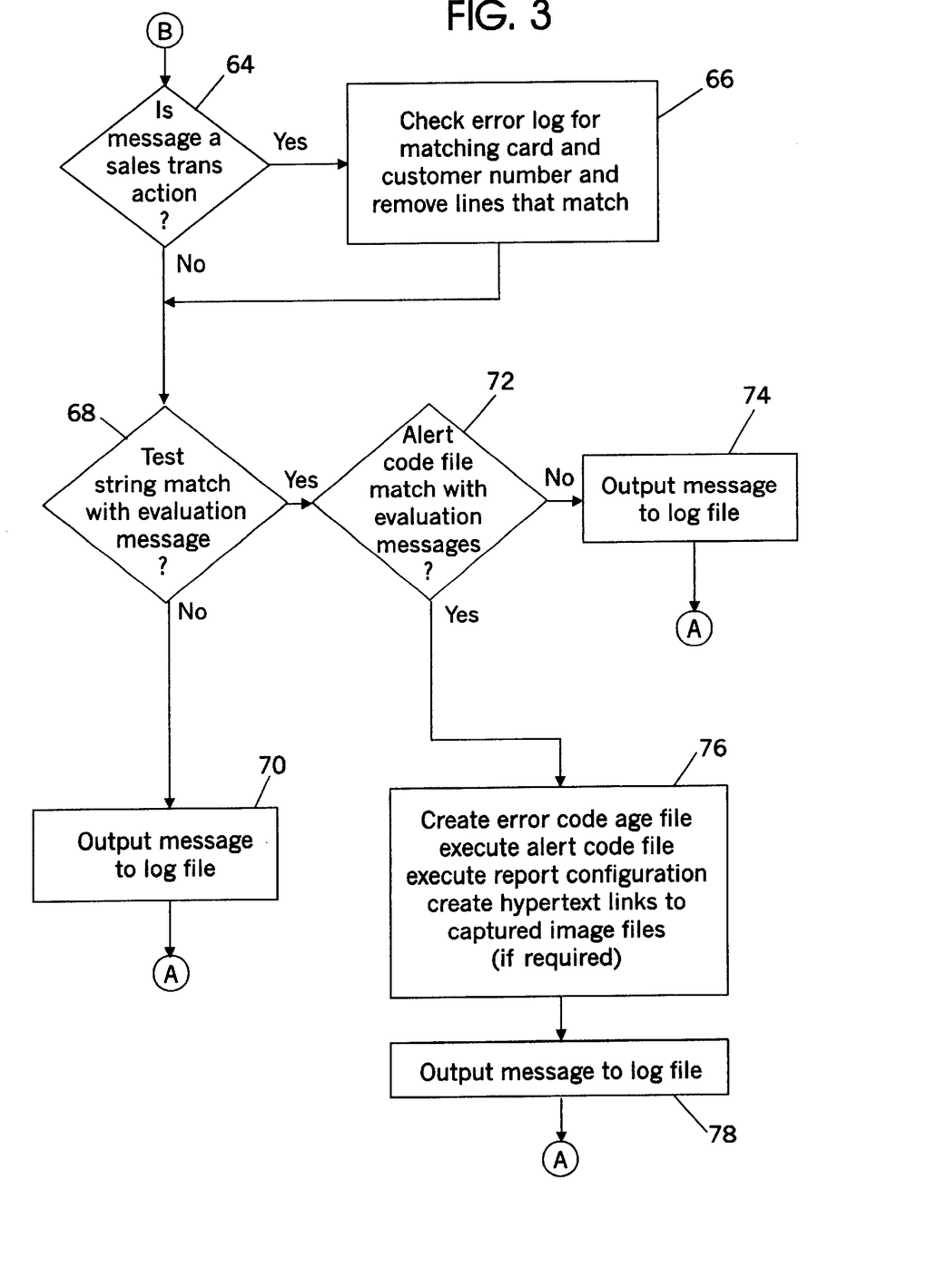

Referring now to FIGS. 2 and 3, the method of the present invention referred to herein as the "capture program" will now be described by reference to the logic of the software loaded into site monitor 38. Referring to FIG. 2, transmission of message 50 to site monitor 38 causes site monitor 38 to initialize a log file (step 52). Message 50 is a text string consisting of one line of text. Each line of text, or message 50, is processed by the invention separately. Initializing log file 52 means that a file has been opened for storage of each incoming message 50 The next step 54 determines whether message 50 is a report end string. We will assume that message 50 is the beginning of a report, i.e., a report start string, not a report end string. If message 50 is a report start string (step 56), site monitor 38 reads from the report start string the report code and links it to a corresponding report configuration (step 58). The method of the invention then loops back to location A. If a second message 50 is not a report end string or a report start string, step 60 determines whether message 50 is message report data. If it is, second message 50 gets stored in the report file in step 62 followed by a loop back to location A.

Now referring to FIG. 3, if a third message 50 is not a message end or start string, and not message report data, then step 64 determines whether third message 50 is a sales transaction. All sales transactions are identified by a number between 0 and 9999 contained in message 50. If third message 50 is a sales transaction, then the invention checks the error log for matching card and customer number and removes any lines that match. For example, if a customer swipes his or her card and enters the wrong personal identification number (PIN), the message 50 corresponding to that transaction contains the customer number and invalid PIN. This third message 50 is seen by the invention as indicating an error and is appended to the error log. However, if the customer subsequently enters a correct PIN, the message 50 corresponding to that transaction will include the customer number, gallons pumped, cost, etc. The invention recognizes this as a sale and scans the error log file. If, as indicated in FIG. 3, step 66, a match occurs, the invention removes the matched text line from the error log file. However, if the customer was unable to enter in the correct PIN, the line of text would remain in the error log file, and the invention would then know that the customer has experienced an error at the card reader that prevented the customer from getting fuel. The invention would respond to this error message as explained in more detail below.

Still referring to FIG. 3, if third message 50 is not a sales transaction, step 68 scans the text string for a match with an evaluation message. If there is no match, message 50 is output to the log file as indicated in step 70. The invention then loops back to location A. However, if there is a match between third message 50 and an evaluation message, then step 72 determines if there is a match between the matched evaluation message and an error code. If not, the invention outputs message 50 to the log file, as shown in step 74, and loops back to location A. If there is a match, an error or other event has occurred at the remote site and an error code age file is created in step 76. Step 76 also includes executing the alert code file and report configuration, and creating hypertext links to the captured image files (if necessary). Subsequently, in step 78, message 50 is output to the log file and the method loops back to location A.

Figures 5, 5D:
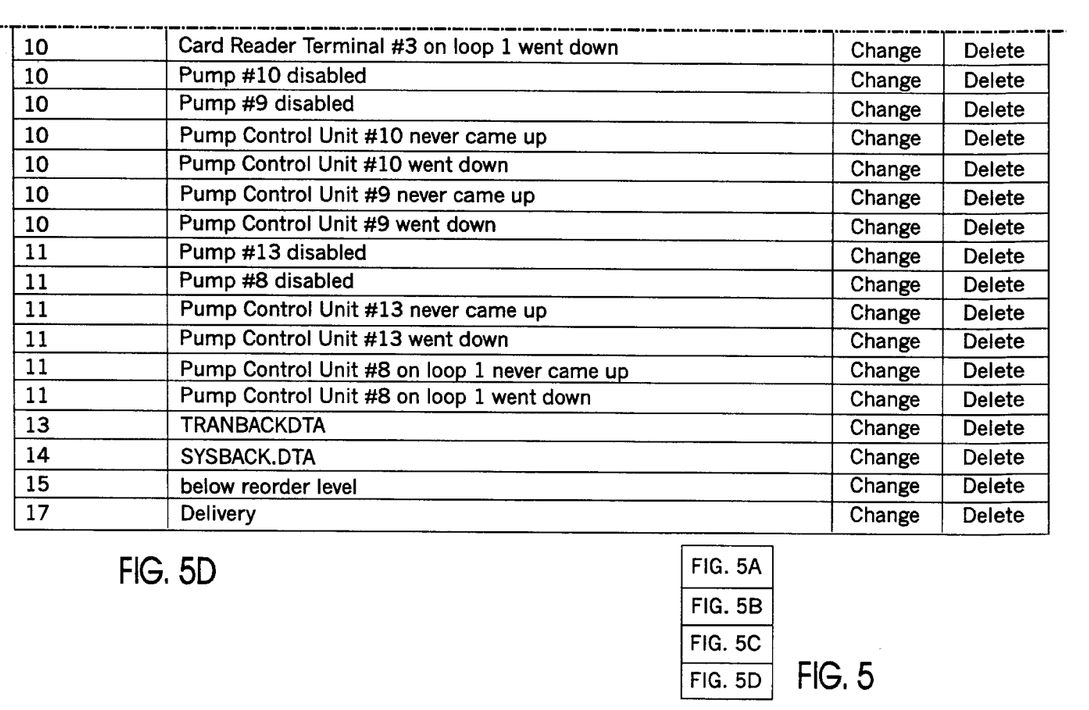
FIGS. 5A–5D are sequences of a diagram of the evaluation messages table of the present invention.
Figure 5A:
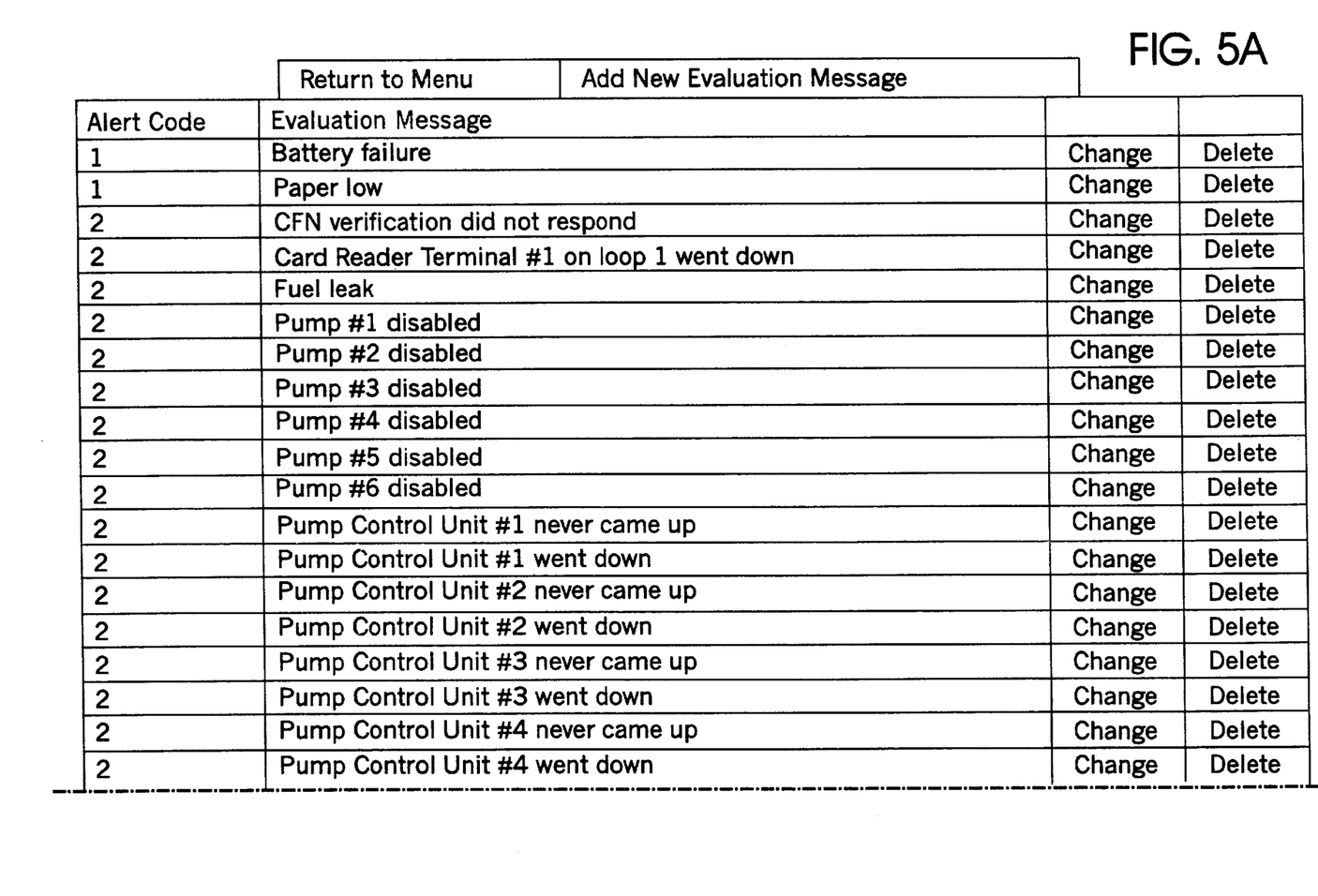
Figure 6:
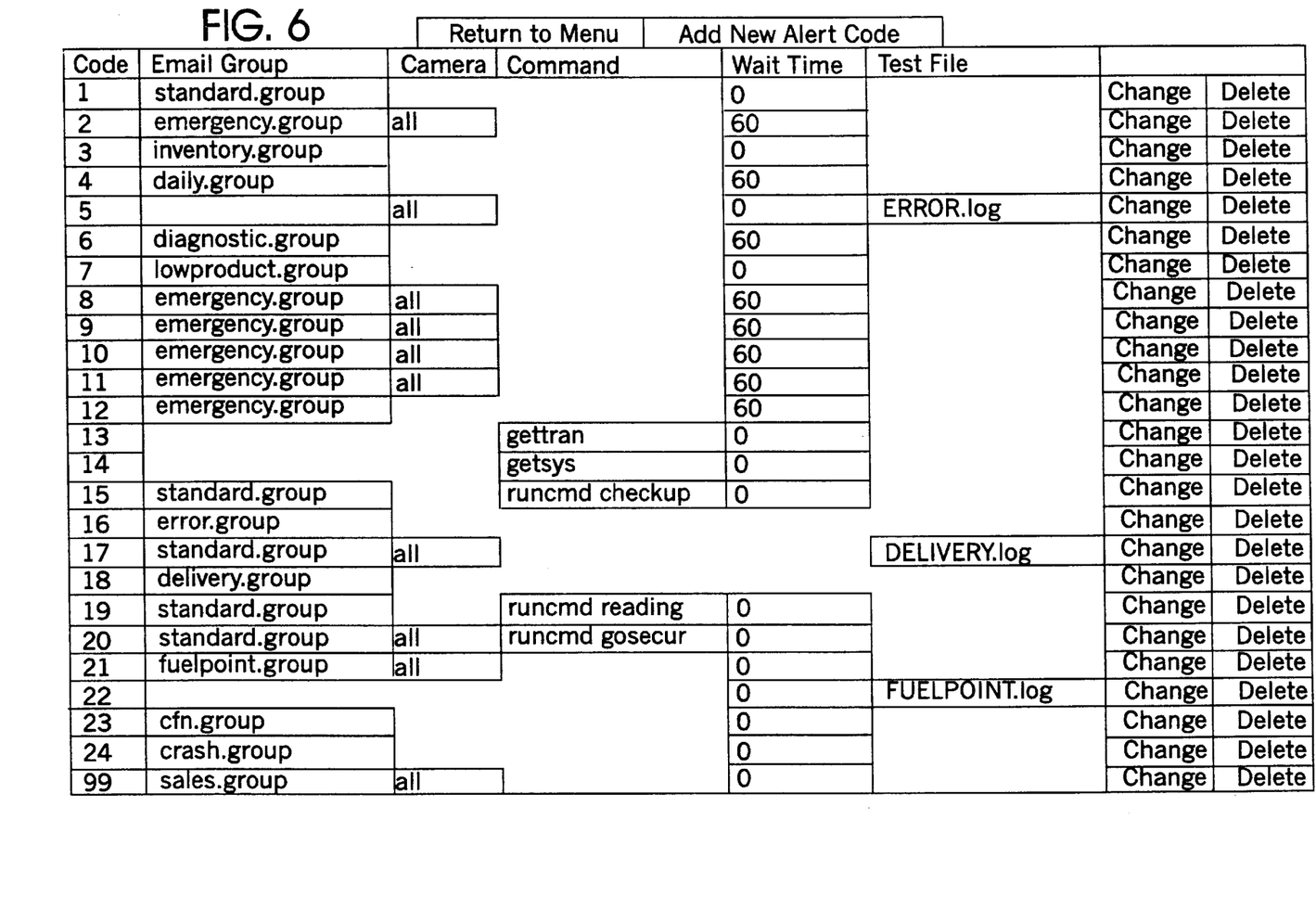
FIG. 6 is a diagram of the error code table of the present invention.

The error code age file referred to above is used in connection with one of the alert code parameters called "wait time." For example, as shown in FIG. 5A, an evaluation message of "pump disabled" has the alert code of "2." As illustrated in FIG. 6, alert code "2" has a wait time of 60 seconds. If all pumps are disabled, site controller 22 output in rapid succession is "pump #1 disabled," "pump #2 disabled," and "pump #3 disabled," for example. Initially, the message 50 "pump disabled" is matched with the evaluation message "pump disabled." The corresponding alert code "2" is executed and an error code age file is created. With each message 50 processed, the "wait time" is compared against the age file for that error code. In this case, if the "pump #2 disabled" occurred within 60 seconds of the "pump #1 disabled" message, the "pump #2 disabled" error message 50 is ignored and not processed. The error code age file and wait time function prevent unnecessary messages (emails, pages, faxes, etc.) from being sent in a specified period of time.

Referring again to FIG. 2, located at the end of each report is a report end string. Therefore, if message 50 is a report end string (step 54), the invention will first close the report file and then scan the messages in the report file and determine which messages 50 match evaluation messages in step 57. Upon finding a match, the appropriate error codes are executed in step 59. Upon scanning the report, the report code is discovered, and the corresponding report configuration is executed in step 61. The method of the invention then loops back to location A.

Figure 4:
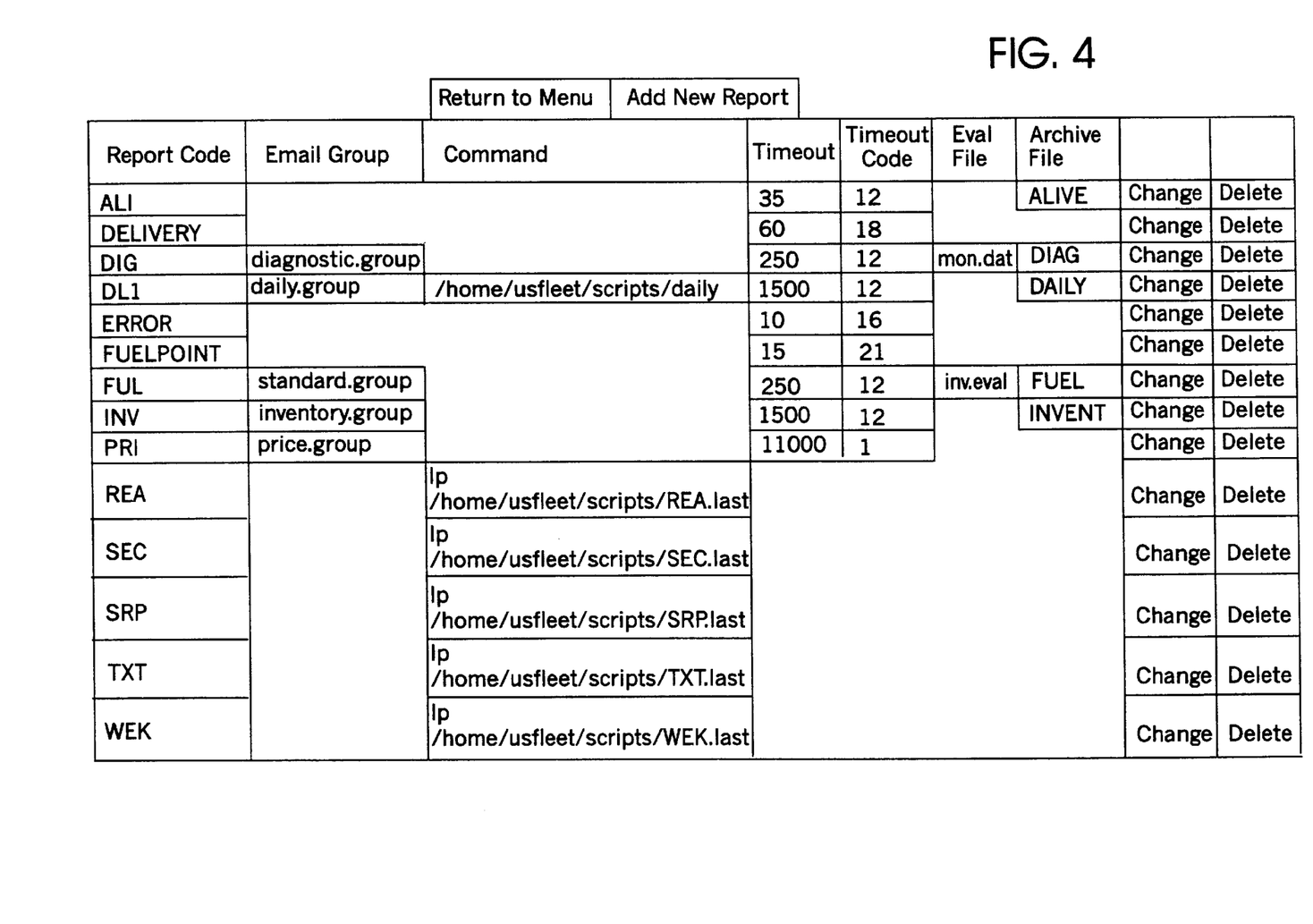
FIG. 4 is a diagram of the reports configuration table of the present invention.

FIGS. 4, 5A, 5B, and 6 show the contents of the report configuration table, the evaluation message table, and the error code table. The following examples briefly describe these tables, and the use of these tables in accordance with the capture program illustrated in FIGS. 2 and 3. Referring to FIG. 4, a report configuration is a set of instructions that, once executed, implement a particular set of responses. Each report code is linked to a particular report configuration. The possible components of each report configuration are: (1) report code, (2) email group, (3) command, (4) timeout, (5) timeout code, (6) evaluation file, and (7) archive file. For example, referring again to FIG. 2, assume the serial output of site controller 22 included a report begin string containing the report code DL1 and the end string for that particular DL1 report (step 54). Step 55 closes the report file and scans the messages in the report file. In step 61, the invention executes the DL1 report configuration. The DL1 report configuration shown in FIG. 4 requires that the following actions occur upon its execution: (1) email messages to members of the "daily.group," (2) execute a set of commands referred to as home/usfleet/scripts./daily (which are commands that initiate a set of daily activities not necessarily related to the daily report). Commands refer to computer commands that can be executed on the site monitor computer. The commands, which can be virtually any command executable by a computer, may be incorporated into the report configuration table. The timeout component for DL1 is set at 1500 minutes (25 hours). The invention, in accordance with the "age reports program" of the invention described in more detail below, determines the age of the DL1 report file (steps 63 and 74). If the report file is 1500 minutes old, i.e., site monitor 38 has not received a daily report in that time frame, timeout code "12" is activated. Timeout code "12" corresponds to alert code "12" (FIG. 6) and once activated will initiate another series of activities. DL1 refers to a report called "Daily" containing information about the transactions, errors, and other recorded events that occurred at the site on a particular day. In this case, the daily routines include rotating the log file and making back up copies of the log files and emailing a copy to the home office.

Referring again to FIG. 4, there are shown fourteen different report codes. The ALI report code is also referred to as the Alive report. The Alive report consists of sales per day, current inventory sale per hour, print monitor, all invents that have occurred, and a list of the day's transactions. This report is emailed every 30 minutes. The ALI report has a timeout of 35 minutes and timeout code of 12. The timeout feature of the program is part of what is referred to as the "age reports program".

The DELIVERY report code is the delivery report. The delivery report is essentially a list of all deliveries made to the site in the last hour. The delivery is only emailed to the delivery group in accordance with execution of alert code "18". The DEL report code has a timeout of 60 minutes.

Still referring to FIG. 4, the DIG report code is referred to as the diagnostic report. The diagnostic report consists of the robot fuel site's current status. This report is emailed to the emergency group every four hours and is scanned in accordance with the capture program described above for alert conditions like pump down or never came up.

DL1 is the daily report, which is the end of the day report consisting of daily fuel sales, running fuel sales, running pump totals, daily merchandise sales, daily sales broken down by club, credit cash, check, and total of all, current inventory, sales by hour, daily events, transaction list and print monitor. The DLI report is emailed every night, and has a timeout of 1500 minutes as more fully described above.

The ERROR report records site errors that have occurred in the last 10 minutes. The error log file stores the error for 10 minutes and is erased if a matching card number gets a go transaction, as also more fully explained above.

The FUELPOINT report captures all fuelpoint tests, and emails the test results to the fuelpoint group. This report is used when the fuelpoint test is used on site. The FUL report, or fuel report, consists of the current inventory and current sales. The fuel report is emailed to the emergency group every four hours. This report is scanned according to the capture program described above for low product conditions.

The INV report, or inventory report, is the same as the FUL report, but it is run at night when the end of the day or DL1 report is run. PRI is the price report consisting of the current system prices, and is run and emailed to the standard group every Sunday. The REA report is a form for site inspectors to write down pump readings. The SEC report is the security report and is a form that the security patrol person fills out on each visit. The SRP report is a site report, and is a form used by the site inspectors when they check the site. The TXT report is a text report and is setup to email something special to the office. The WEK report consists of the weekly readings and is run when the site is inspected by the site inspectors. It consists of the daily sales, running pump totals, and current inventory.

Referring to FIGS. 5A, 5B, 5C, and 5D, evaluation messages are listed in numerical order. By way of explanation, assume message 50 is "battery failure" and is transmitted by site controller 22 along line 36 to site monitor 38 (FIG. 1). As shown by the evaluation message table of FIG. 5A, "battery failure" corresponds to alert code "1."

Referring again to FIG. 6, alert code "1" simply requires that the "battery failure" message be emailed to the standard group. No wait time is required.

Figure 5B:
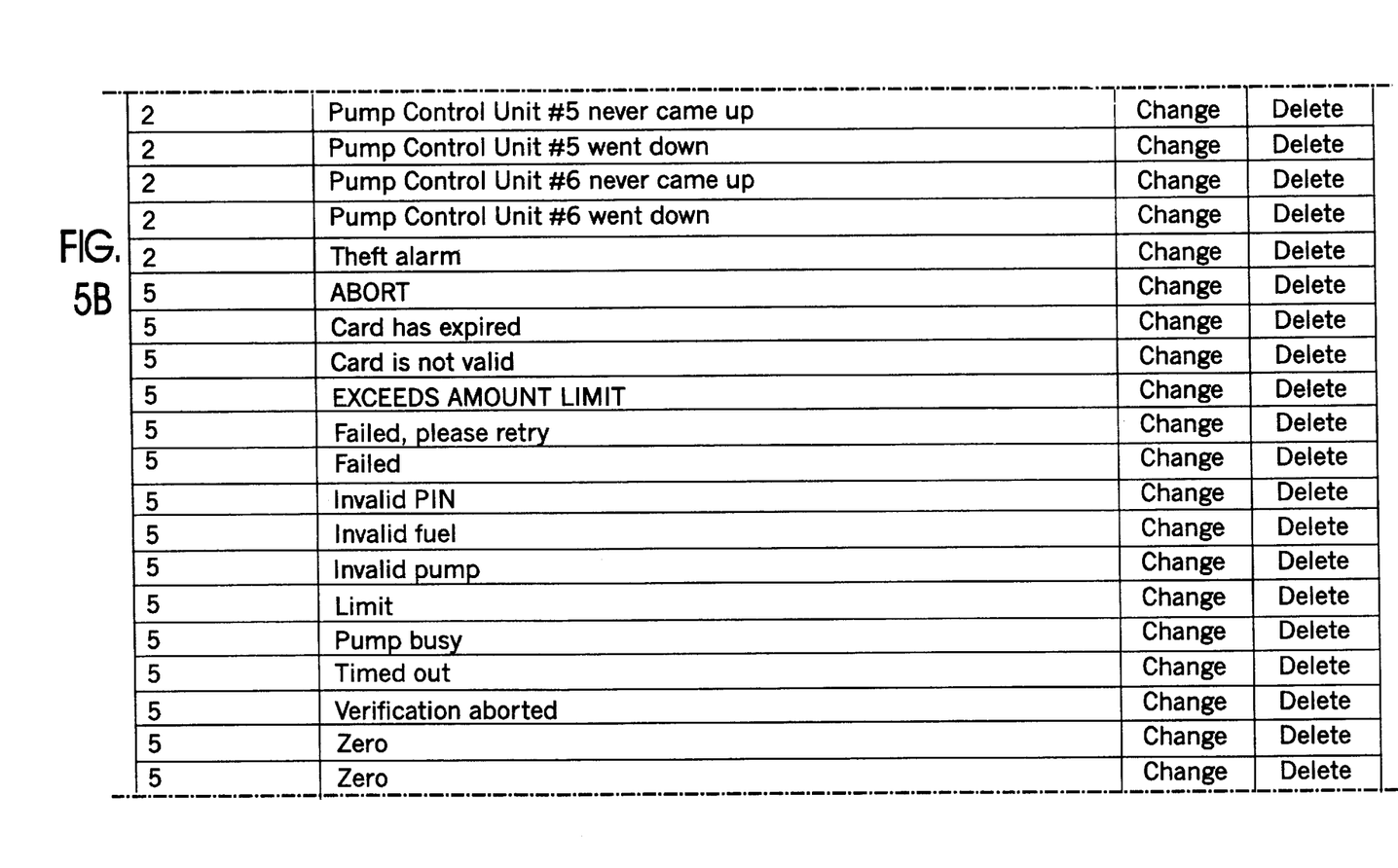
Figure 5C:
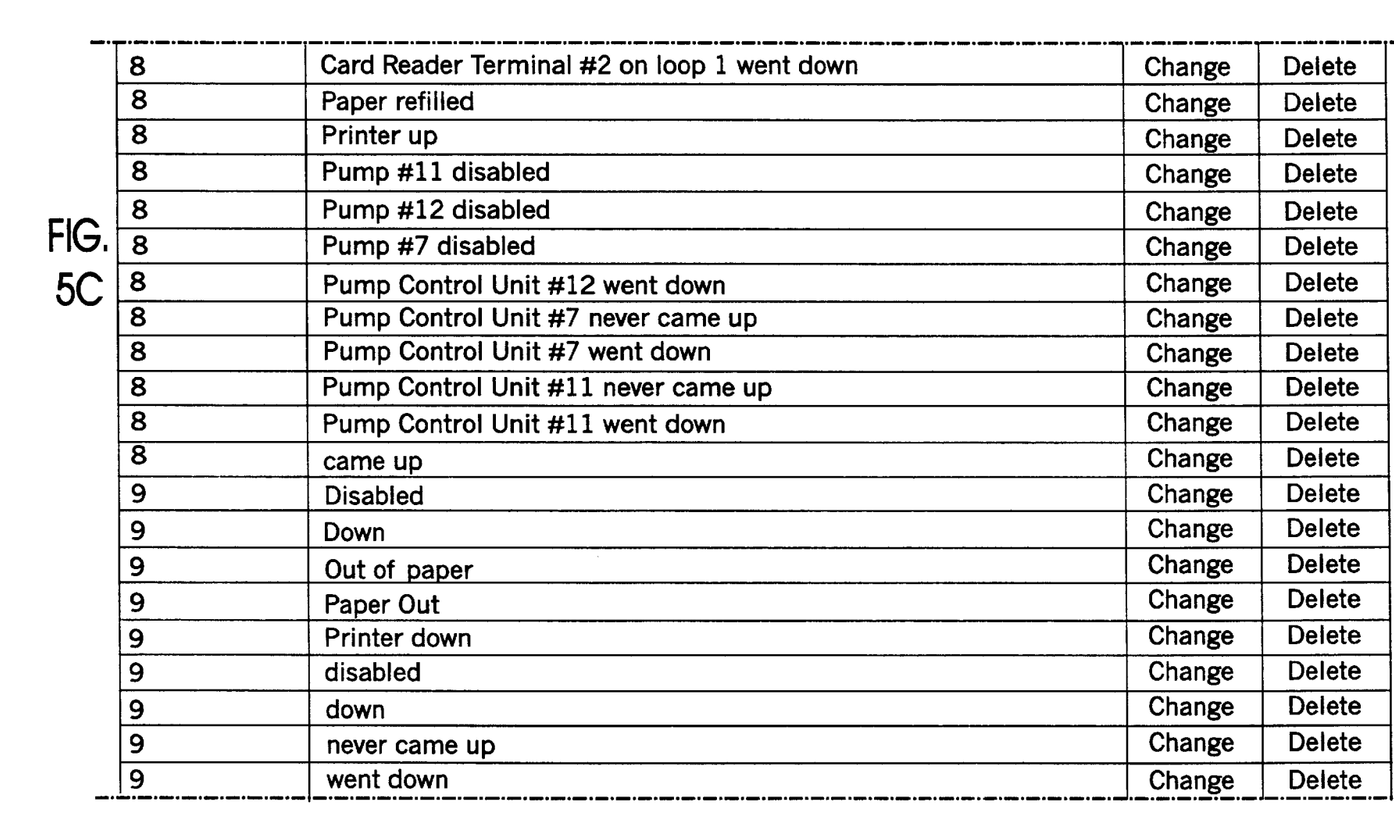

In another example, assume that another message received by site monitor 38 is "invalid fuel." The invention matches evaluation message "invalid fuel" with message 50 "invalid fuel." Site monitor 38 then matches the evaluation message "invalid fuel" with its corresponding alert code 5 (FIG. 5B). Referring still to FIG. 6, upon activation of alert code 5, all cameras are activated and the error log is created in which the invalid fuel message is stored. Message 50 that is stored in HTML log file 46 becomes a hyperlink to the image file containing the image corresponding to that particular "invalid fuel" message. There are a number of transactional-type errors associated with alert code 5, for example, "card has expired," "card is not valid," "failed, please retry," "invalid pin," to name a few. All error messages received by site monitor 38 are similarly processed and filed in the error log for further action by the invention and are also stored in HTML text log file 46.

Now referring to FIG. 6, the alert code table contains examples of alert codes available to the invention. Alert codes are labeled 1–24 and 99. Each alert code may include the following components: (1) email group, (2) camera, (3) command, (4) wait time, and (5) test file. The alert codes can be edited, added, or deleted through use of the "change" and "delete" options. Upon execution of alert code 12, for example, the above-mentioned DL1 report is remained to the emergency group. A wait time of 60 seconds is then set. Wait time refers to the number of seconds that is required before the another alert code 12 would be recognized and activated by the invention.

The site manager method and apparatus of the present invention also includes two programs referred to as the age reports program and the age logs program. The age reports program is activated every five minutes. It scans the report configuration file and for each report it compares the time the last message 50 was printed with the timeout parameter for that report. If the timeout is reached, then the timeout code is activated as already described above. The age logs program is also activated every five minutes. It scans the error log file and compares the time the last message 50 was printed with the timeout parameter for the error report configuration (10 minutes). If the timeout is reached, then the corresponding timeout code is activated.

The age logs program is now explained by way of example. The "invalid fuel" message 50 occurs when a customer does not select a valid fuel. The "invalid fuel" message 50 would be processed by the capture program of the invention as described above and, thus, be filed in the error log file. As stated, the age logs program scans the error log every 5 minutes. If the customer does not select a valid fuel within 10 minutes, i.e., the "invalid fuel" message is older than 10 minutes, the message is not deleted from the error log in accordance with steps 64 66, (FIG. 2) and alert code "16" is activated (FIG. 6). Alert code 16 causes the entire error log file to be emailed to the home office, which is therefore alerted to the problem and able to take corrective action. Thus, all errors are added and deleted from the error log on a continual basis. Upon receiving the error log, the home office will know the customer number of the customer currently at the robot fuel site. They can then call the customer's home office and inform them of the particular problem. The customer's home office could then call the trucker at the pump, and inform the trucker that he or she must pump a different fuel. By using the present invention, an operator of a robot liquid storage and dispensing site can immediately address problems and solve them during the time a customer is still on site. As illustrated in FIGS. 5A and 5B, the evaluation messages address such fuel site problems as: card has expired, card is not valid, exceeds amount limit, failed, please retry, invalid PIN, invalid pump, limit, pump busy, timed out, verification aborted, etc.

The age reports program of the invention operates similarly to the age logs program. For example, ALI report code received by site monitor 38 is required to be emailed to the emergency group every 30 minutes in accordance with the capture program described above. The age reports program scans the ALI report every five minutes. If the age reports file sees that the ALI report is 35 minutes old, it activates error code 12 causing the ALI report to be emailed to the emergency group, which is thus informed that the system is not communicating, and can take the necessary steps to correct the problem. The age report programs continually scans all report files to determine if one or more have "aged out."

As stated above, it is within the scope of the invention to incorporate the site monitor into the site controller. In that case, as illustrated in FIG. 1, site monitor 38 would not scan the serial port of site controller 22, but would scan what is referred to as the site controller 22 "journal file." Every time a line of data is received by the site controller 22 journal file from a site device, the site monitor 38 would pick it up and process it according to the "capture program" described above.

While the invention has been described with reference to specific embodiments thereof, it will be appreciated that numerous variations, modifications, and embodiments are possible, and accordingly, all such variations, modifications, and embodiments are to be regarded within the spirit and scope of the invention.

What is claimed is:

1. An apparatus enabling an operator to remotely manage a liquid storage and dispensing system, comprising:
    a) a site controller for receiving information from said liquid storage and dispensing system, wherein said information may correspond to data relating to a failure in said system and converting said information to one or more text strings; and
    b) a site monitor linked to said site controller and a webserver, said site monitor including means for:
        i) determining if said information is a sales transaction;
        ii) if said information is not a sales transaction, finding a match between said text strings and any one of a plurality of stored evaluation messages corresponding to said information; and
        iii) initiating a particular set of responses based on said match, including automatically informing said operator of said system failure.

2. An apparatus enabling an operator to remotely manage a liquid storage and dispensing system according to claim 1, further comprising means for converting said information to an HTML text file for publication by said webserver over the Internet.

3. An apparatus enabling an operator to remotely manage a liquid storage and dispensing system according to claim 1, wherein said means for automatically informing said operator of said system failure includes sending to said operator an email identifying said failure.

4. An apparatus enabling an operator to remotely manage a liquid storage and dispensing system according to claim 1, further comprising at least one camera, for taking images of said liquid storage and dispensing site, wherein said images are stored as HTML image files on said webserver.

5. An apparatus enabling an operator to remotely manage a liquid storage and dispensing system according to claim 4, including means to hyperlink said HTML image files to related HTML text files.

6. An apparatus enabling an operator to remotely manage a liquid storage and dispensing system according to claim 5, wherein said information is one or more text messages.

7. An apparatus enabling an operator to remotely mane a liquid storage and dispensing system according to claim 6, wherein each said text message is comprised of one line of text.

8. An apparatus enabling an operator to remotely manage a liquid storage and dispensing system according to claim 7, wherein said line of text is stored as an HTML text file hyperlinked to a related said HTML image file.

9. An apparatus enabling an operator to remotely manage a liquid storage and dispensing system according to claim 1, wherein said liquid storage and dispensing system is one or more robot vehicle fuel storage and dispensing sites.

10. An apparatus enabling an operator to remotely manage a liquid storage and dispensing system according to claim 1, wherein said liquid storage and dispensing system is a liquid chemical storage and dispensing system.

11. An apparatus enabling an operator to remotely manage a liquid storage and dispensing system according to claim 1, wherein said liquid storage and dispensing system is a municipal water storage and dispensing system.

12. An apparatus enabling an operator to remotely manage a liquid storage and dispensing system according to claim 1, further comprising means to determine the age of said failure in said system, whereby when said age exceeds a selected time a specific action based on the nature of said failure is initiated, including automatically informing said operator of said system failure.

13. An apparatus enabling an operator to remotely manage a liquid storage and dispensing system, comprising:
    a) a site controller for receiving information in the form of a series of text messages from said liquid storage and dispensing system, said site controller generating serial output as text strings corresponding to said information, wherein said information may correspond to data relating to a failure in said system;
    b) a site monitor linked to said site controller and an Internet webserver, said site monitor including means for:
        i) scanning said serial output;
        ii) finding a match between said serial output and one of a plurality of stored evaluation messages corresponding to said information;
        iii) linking each said evaluation message with a specific error code; and
        iv) initiating specific actions upon said site monitor finding a match between said serial output and one of said evaluation messages, said specific action including automatically informing said operator of said system failure; and
    c) at least one camera, for taking images of said liquid storage and dispensing site, wherein said images are stored as HTML image files on said webserver.

14. An apparatus enabling an operator to remotely manage a liquid storage and dispensing system according to claim 13, further comprising converting said serial output to an HTML text file for publication by said webserver over the Internet.

15. An apparatus enabling an operator to remotely manage a liquid storage and dispensing system according to claim 13, wherein said automatically informing said operator of said system failure includes sending to said operator an indentifying said failure.

16. An apparatus enabling an operator to remotely manage a liquid storage and dispensing system according to claim 13, further comprising means to hyperlink said HTML image files to related HTML text files.

17. An apparatus enabling an operator to remotely manage a liquid storage and dispensing system according to claim 13, wherein said liquid storage and dispensing system is one or more robot vehicle fuel storage and dispensing sites.

18. An apparatus enabling an operator to remotely manage a liquid storage and dispensing system according to claim 13, wherein said liquid storage and dispensing system is a liquid chemical storage and dispensing system.

19. An apparatus enabling an operator to remotely manage a liquid storage and dispensing system according to claim 13, wherein said liquid storage and dispensing system is a municipal water storage and dispensing system.

20. An apparatus enabling an operator to remotely manage a liquid storage and dispensing system according to claim 13, wherein each said text message is comprised of one line of text.

21. An apparatus enabling an operator to remotely manage a liquid storage and dispensing system according to claim 20, wherein said line of text is stored as an HTML text file hyperlinked to related HTML image file.

22. An apparatus enabling an operator to remotely manage a liquid storage and dispensing system according to claim 13, further comprising means to determine the age of said failure in said system, whereby when said age exceeds a selected time a specific action based on the nature of said failure is initiated, including automatically informing said operator of said system failure.

23. A method for monitoring and maintaining a liquid storage and dispensing system comprising:
  a) establishing a connection between said liquid storage and dispensing system and a computer system;
  b) communicating information in the form of a series of single line text messages related to the status of said liquid storage and dispensing system to said computer system, wherein said information may correspond to data relating to a failure in said system;
  c) finding a match between said information and one of a plurality of stored evaluation messages stored in said computer system, whereupon finding said match:
    i.) linking each said evaluation message with a specific error code; and
    ii.) initiating actions based upon the parameters of said specific error code, including automatically informing said operator of said system failure;
  d) taking images of said liquid storage and dispensing site and storing said images as HTML image files on said computer system; and
  e) connecting said HTML image files to related HTML text files.

24. A method for monitoring and maintaining a liquid storage and dispensing system according to claim 23, further comprising converting said information to an HTML text file for Internet publication by a webserver connected to said computer system.

25. A method for monitoring and maintaining a liquid storage and dispensing system according to claim 24, further hyperlinking said HTML image files to said HTML text file.

26. A method for monitoring and maintaining a liquid storage and dispensing system according to claim 23, further comprising informing automatically said operator of said system failure, including sending to said operator an email identifying said failure.

27. A method for monitoring and maintaining a liquid storage and dispensing system according to claim 23, further comprising taking images of said liquid storage and dispensing site, wherein said images are stored as HTML image files on a webserver for Internet publication.

28. A method for monitoring and maintaining a liquid storage and dispensing system according to claim 23, further comprising determining the age of said failure in said system, whereby when said age exceeds a selected time initiating a specific action, based on the nature of said failure, including automatically informing said operator of said system failure.

29. A apparatus enabling an operator to remotely manage a liquid storage and dispensing system, comprising:
  a) a site controller for receiving information in the form of text messages from said liquid storage and dispensing system, wherein said information may correspond to data relating to a failure in said system;
  b) a site monitor linked to said site controller and a webserver, said site monitor including means for:
    i) finding a match between said information and any one of a plurality of stored evaluation messages corresponding to said information; and
    ii) initiating a specific action based on said match, including automatically informing said operator of said system failure;
  c) at least one camera, for taking images of said liquid storage and dispensing site, wherein said images are stored as HTML image files on said webserver; and
  d) means to hyperlink said HTML image files to related HTML text files.

30. An apparatus enabling an operator to remotely manage a liquid storage and dispensing system according to claim 29, wherein each said text message is comprised of one line of text and said line of text is stored as an HTML text file hyperlinked to a related HTML image file.

* * * * *

UNITED STATES PATENT AND TRADEMARK OFFICE
CERTIFICATE OF CORRECTION

PATENT NO. : 6,259,956 B1
DATED : July 10, 2001
INVENTOR(S) : Robert J. Myers, William Long, III and Ben E. Winstead It is certified that error appears in the above-identified patent and that said Letters Patent is hereby corrected as shown below:

<u>Title page</u>,
Item [73], Assignee listed as "Rawl & Winstead, Inc." should read -- Rawls & Winstead Inc. --

Signed and Sealed this

Seventh Day of May, 2002

Attest:

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO.    : 6,259,956 B1                                              Page 1 of 1
DATED         : July 10, 2001
INVENTOR(S)   : Robert J. Myers, William Long, III and Ben Winstead, III It is certified that error appears in the above-identified patent and that said Letters Patent is hereby corrected as shown below:

Column 2,
Line 43, change "fixes" to read -- faxes --.
Line 54, change "whom" to read -- which --.

Column 3,
Line 32, after "dispenser number" please insert a comma (,).

Column 4,
Line 59, after "50" insert a comma (,).

Column 7,
Line 65, change "remained" to read -- emailed --.

Column 9,
Line 45, "name" should read -- manage --.

Signed and Sealed this

Fourth Day of June, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO.    : 6,259,956 B1
DATED         : July 10, 2001
INVENTOR(S)   : Robert J. Myers, William Long, III and Ben E. Winstead, III It is certified that error appears in the above-identified patent and that said Letters Patent is hereby corrected as shown below:

Column 2,
Line 43, change "fixes" to read -- faxes --.
Line 54, change "whom" to read -- which --.

Column 3,
Line 32, after "dispenser number" please insert a comma -- , --.

Column 4,
Line 59, after "50" insert a comma -- , --.

Column 7,
Line 65, change "remained" to read -- emailed --.

Column 9,
Line 45, "mame" should read -- manage --.

Signed and Sealed this

Tenth Day of September, 2002

Attest:

JAMES E. ROGAN
Attesting Officer        Director of the United States Patent and Trademark Office

UNITED STATES PATENT AND TRADEMARK OFFICE
CERTIFICATE OF CORRECTION

PATENT NO. : 6,259,956 B1
DATED : July 10, 2001
INVENTOR(S) : Robert J. Myers, William Long, III and Ben E. Winstead, III

It is certified that error appears in the above-identified patent and that said Letters Patent is hereby corrected as shown below:

<u>Title page,</u>
Item [73], Assignee listed as "Rawl & Winstead, Inc." should read
-- Rawls & Winstead, Inc. --

Signed and Sealed this

Fifteenth Day of October, 2002

*Attest:*

*Attesting Officer*

JAMES E. ROGAN
*Director of the United States Patent and Trademark Office*